United States Patent
Senn

(10) Patent No.: US 12,434,926 B2
(45) Date of Patent: Oct. 7, 2025

(54) PAPER RAMP

(71) Applicant: Sonoco Development, Inc., Hartsville, SC (US)

(72) Inventor: Jonathan E. Senn, Nashville, TN (US)

(73) Assignee: Sonoco Development, Inc., Hartsville, SC (US)

(*) Notice: Subject to any disclaimer, the term of this patent is extended or adjusted under 35 U.S.C. 154(b) by 610 days.

(21) Appl. No.: 17/897,384

(22) Filed: Aug. 29, 2022

(65) Prior Publication Data

US 2024/0067468 A1    Feb. 29, 2024

(51) Int. Cl.
*B65G 69/30*    (2006.01)
*B65G 67/20*    (2006.01)

(52) U.S. Cl.
CPC ............. *B65G 69/30* (2013.01); *B65G 67/20* (2013.01)

(58) Field of Classification Search
CPC ........ B65G 69/30; B65G 67/20; B65D 19/35; B65D 2519/00805
USPC ............................................. 14/69.5; D34/32
See application file for complete search history.

(56) References Cited

U.S. PATENT DOCUMENTS

| | | | |
|---|---|---|---|
| 4,285,514 A * | 8/1981 | Romero | A63G 31/00 472/89 |
| 4,310,271 A * | 1/1982 | Canellis | B60P 3/07 410/23 |
| 4,368,553 A | 1/1983 | Perry | |
| 5,505,140 A | 4/1996 | Wittmann | |
| 5,911,179 A | 6/1999 | Spiczka | |
| 6,105,511 A | 8/2000 | Bridges | |
| 6,240,854 B1 | 6/2001 | Heil | |
| 6,769,368 B2 | 8/2004 | Underbrink | |
| 8,646,140 B2 | 2/2014 | Branyon | |
| 2004/0232021 A1 | 11/2004 | Linton | |
| 2005/0132511 A1 | 6/2005 | Berg | |
| 2009/0255066 A1 | 10/2009 | Brock | |

FOREIGN PATENT DOCUMENTS

| | | | |
|---|---|---|---|
| CN | 102933778 A | 2/2013 | |
| EP | 0174655 B1 * | 12/1990 | |
| EP | 3981673 A1 * | 4/2022 | ............... B62H 3/02 |
| KR | 20170142883 A | 12/2017 | |

OTHER PUBLICATIONS

International Search Report related to Application No. PCT/US2023/031395; reported on Dec. 8, 2023.

* cited by examiner

*Primary Examiner* — Gary S Hartmann
(74) *Attorney, Agent, or Firm* — von Briesen & Roper, s.c.

(57) ABSTRACT

A ramp assembly that can be used to unload a wheeled article from a pallet or shipping base. The ramp assembly may comprise two top members affixed to a bottom member, each component made of folded paper based material.

20 Claims, 16 Drawing Sheets

PAPER RAMP

BACKGROUND OF THE INVENTION

Field of the Invention

This disclosure relates to pallets. More particularly, this disclosure relates to a ramp made from folded paper based components that can be used, for example, to unload a wheeled product from a pallet or shipping base. The ramp can be folded flat and is easily assembled.

Description of the Related Art

Large household appliances and other articles often are shipped in protective packaging which includes a shipping base, vertical supports, a top cap, and an outer carton or transparent plastic wrapping. The article may be placed on the base during assembly and stays on the base until the article reaches its final destination. There the packaging is removed and the article lifted or otherwise taken off the base.

Modern appliances often have wheels or casters for easier moving. However, even with wheels or casters it remains difficult to move a large article off its shipping base and onto the surrounding floor. Various ramps have been incorporated into product packaging designs to make this task easier. For example, U.S. Pat. No. 5,505,140 discloses a pallet having wooden ramps that can be stored underneath the load bearing surface of the pallet and pulled out for use. U.S. Pat. No. 5,911,179 discloses a ramp hingedly attached to a pallet deck. U.S. Pat. No. 6,105,511 discloses a pallet and a pair of boards that can be used as ramps and that can be stored on top of the pallet when not in use. U.S. Pat. No. 6,240,854 discloses a pallet for a wheeled item, the pallet having ramps formed on the pallet surface and wedges that fit within the ramps to help load the wheeled article onto the pallet. Once the article is loaded onto the pallet the wedges are removed and the article's undercarriage is supported by an integrally formed support member. A separate loading ramp is provided for loading the article onto the pallet. U.S. Pat. No. 6,769,368 discloses a ramp hingedly attached to a pallet deck. U.S. Patent Publication No. 2004/0108238 discloses a shipping carton base having hinged ramps attached to the base. The ramps are preferable made of plywood. U.S. Patent Publication No. 2004/0232021 discloses a shipping container having a ramp attached to the container floor by hinges. U.S. Patent Publication No. 2008/0000397 discloses a shipping container having a plywood ramp attached to the container floor by hinges.

None of these references describes a ramp that is made entirely from folded paper blanks. This may be because heretofore no one has successfully developed a paper ramp that can withstand the load forces of a large wheeled or castered article.

The present disclosure is designed to solve the problems described above.

BRIEF SUMMARY OF THE INVENTION

The present disclosure relates to a ramp assembly that can be used to unload a wheeled article from a pallet or shipping base. The ramp assembly may comprise two top members affixed to a bottom member, each component made of folded paper based material. The resulting ramp is recyclable and surprisingly strong.

In a first aspect the disclosure provides a two piece ramp comprising a bottom member and a top member. The bottom member is made from a first bottom member blank and comprises a rectangular base panel having a linear proximal edge, a linear distal edge and parallel opposing side edges. The bottom member further comprises an integrally formed proximal panel extending perpendicularly upward from the proximal edge and terminating at a proximal upper edge, the proximal panel defining four proximal slots extending downward from the proximal upper edge. The bottom member further comprises an integrally formed distal panel extending perpendicularly upward from the distal edge and terminating at a distal upper edge, the distal panel defining four linear distal slots extending downward from the distal upper edge. The top member is made from a separate top member blank folded into a wedge shaped structure defining an interior space and comprising an elongated slanted top panel having opposing side edges, a distal edge and a proximal edge, a vertically oriented, substantially triangular, first side panel foldably attached to the top panel along each of the opposing side edges, each first side panel defining a first bottom edge and comprising a substantially rectangular rear portion having a top edge and extending rearward of the proximal edge. The top member further comprises a horizontally oriented rectangular bottom panel hingedly attached to each first side panel along the first bottom edge and extending to a second bottom edge parallel to the first bottom edge, and a triangular inner support panel hingedly attached to each bottom panel along the second bottom edge. Each inner support panel comprises a substantially rectangular second rear portion extending rearward of the rear edge and having a horizontal top edge. Each inner support panel defines a slanted top edge parallel to and co-planar with the two side edges. The inner support panels are located in the interior space. The top member defines a transverse proximal slot configured to receive and engage the proximal panel and a transverse distal slot configured to receive the distal panel such that a portion of each of the two bottom panels located between the proximal slot and the distal slot abuts and rests on the base panel. The four proximal slots and the four distal slots receive and engage the side panels and the inner support panels.

In a second aspect a ramp assembly for use in loading and offloading an article from a shipping base is provided. The article may have wheels, casters or other moving means. The ramp assembly comprises two two-piece ramps in parallel and disposed adjacent the shipping base so that each rear portion is disposed under the shipping base.

In a third aspect a one-piece ramp assembly comprising a single bottom member and two top members is provided. The bottom member is made from a bottom member blank, and comprises a rectangular base panel having a proximal edge and a distal edge, an integrally formed proximal panel extending perpendicularly upward from the base panel along the proximal edge and terminating at a proximal upper edge, the proximal panel defining a first set of four proximal slots configured to receive a first top member and a second set of four proximal slots configured to receive a second top member, the bottom member further comprising an integrally formed distal panel extending perpendicularly upward from the base panel along the distal edge and terminating at a distal upper edge, the distal panel defining a first set of four distal slots configured to receive the first top member and a second set of four distal slots configured to receive the second top member. Each of the first and second top members is made from a top member blank folded into a wedge shaped structure defining an interior space. The proximal slots of each top member receive and engage the proximal panel of the single bottom member and the distal slots of the top members receive and engage the distal panel of the bottom member to lock the two top members onto the bottom member.

In a fourth aspect a one piece ramp comprising a bottom portion and a top portion is provided. The bottom portion comprises a rectangular base panel having a proximal edge and a distal edge, an integrally formed vertical panel extending perpendicularly upward from the base panel along the proximal edge and terminating at a proximal upper edge, the vertical panel defining four proximal slots extending downward from the proximal upper edge. The top portion forms a wedge shaped structure that defines an interior space and is connected to the bottom member portion along the distal edge. The top portion comprises an elongated slanted top panel having opposing side edges and a proximal edge. The top portion defines transverse slots, and further comprises a side panel extending downward from each side edge and defining a first bottom edge, each side panel comprising a rear portion having a top edge and being partially separated from a main portion of the side panel by a proximal slot. The top portion further comprises a proximal locking panel extending vertically downward from the rear edge and comprising four slots extending upward from a bottom edge and configured to receive and engage the side panels and the inner support panels, The top portion further comprises a horizontally oriented bottom panel hingedly attached to each side panel along a first bottom edge and having a second bottom edge. The top portion further comprises a triangular inner support panel hingedly attached to each bottom panel along the second bottom edge, each inner support panel comprising a second rear portion extending rearward of the proximal edge and separated from a main part of the inner support panel by a slot, the inner support panels being located in the interior space. The slots are configured to receive and engage the side panels and the inner support panels.

In a fifth aspect a reinforced ramp comprising a bottom member and a top member is provided. The bottom member comprises a rectangular base panel having a linear proximal edge and a linear distal edge. The bottom member further comprises an integrally formed proximal panel extending perpendicularly upward from the base panel along the proximal edge and terminating at a proximal upper edge. The proximal panel defines three or more proximal slots. The bottom member further comprises an integrally formed distal panel extending perpendicularly upward from the base panel along the distal edge and terminating at a distal upper edge. The distal panel defines three or more distal slots. The top member defines an interior space and comprises an elongated slanted top panel having opposing side edges, a distal edge and a proximal edge, and a vertically oriented, substantially triangular side panel foldably attached to the top panel along each of the opposing side edges. The top member further comprises a horizontally oriented bottom panel hingedly attached to each side panel, and a triangular inner support panel hingedly attached to the bottom panel and comprising a second rear portion extending rearward of the proximal edge and having a horizontal top edge. Each inner support panel defines a slanted top edge parallel to and co-planar with the two side edges. The inner support panels are located inside the interior space. The top member further comprises a triangular outer support panel hingedly attached to each inner support panel along a slanted top edge, each outer support panel comprising a substantially rectangular second rear portion extending rearward of the proximal edge of the top panel, the rectangular second rear portion having a horizontal top edge. Each outer support panel defines a bottom edge that abuts a bottom panel. Each outer support panel is in flat facing abutment with a corresponding inner support panel. The top member defines a transverse proximal slot configured to receive and engage the proximal panel and a transverse distal slot configured to receive the distal panel such that a portion of each of the two bottom panels located between the proximal slot and the distal slot abuts and rests on the base panel. The three or more proximal slots and the three or more distal slots receive and engage the side panels, the inner support panels and the outer support panels.

DETAILED DESCRIPTION OF THE INVENTION

Figure 1:
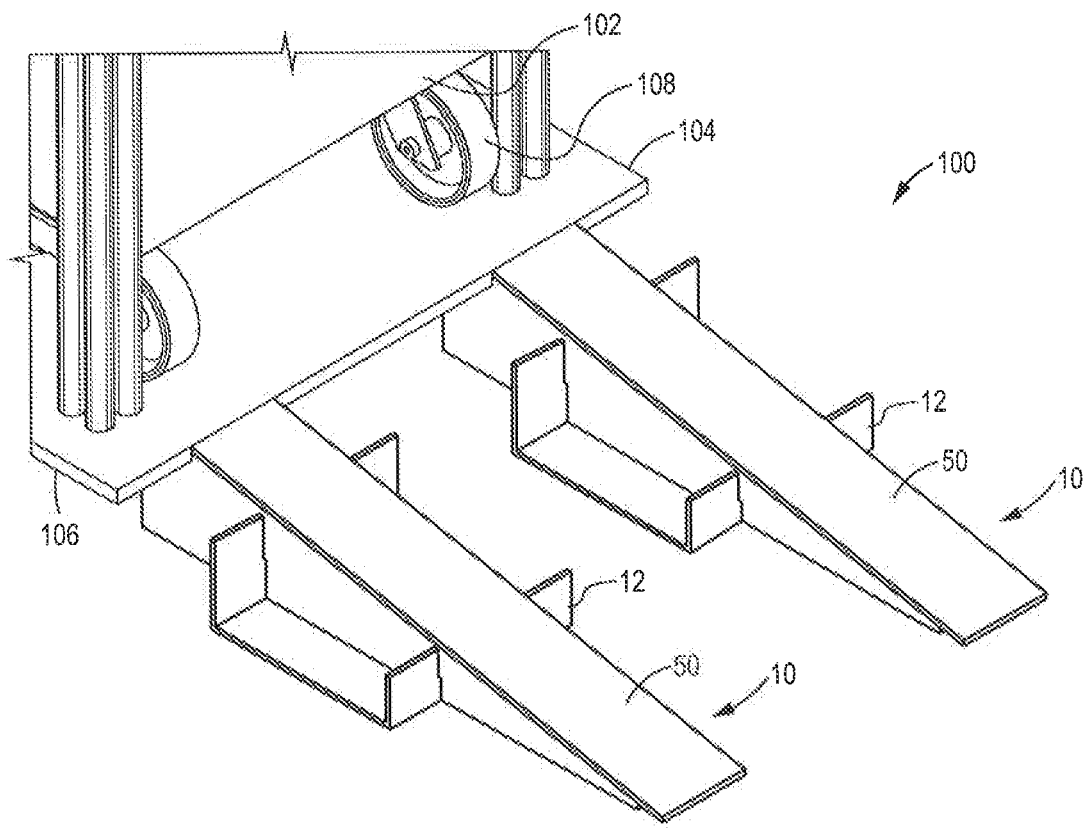
FIG. 1 is a perspective view of a ramp assembly according to the disclosure shown being used to unload an office appliance, the ramp assembly comprising a pair of ramps.

While the invention described herein may be embodied in many forms, there is shown in the drawings and will herein be described in detail one or more embodiments with the understanding that this disclosure is to be considered an exemplification of the principles of the invention and is not intended to limit the disclosure to the illustrated embodiments. Aspects of the different embodiments can be combined with or substituted for one another.

As will be appreciated, terms such as "above" and "below", "tipper" and "lower", "top" and "bottom," "front" and "back," (etc.), used as nouns, adjectives or adverbs refer in this description to the orientation of the ramp structure as it is illustrated in the various embodiments and views. Such terms are not intended to limit the invention to a particular orientation.

First Embodiment (Set of Two, Two-Piece Ramps)

Turning to the drawings, where like numerals indicate like elements, there is shown in FIG. 1 one embodiment of the present invention, a ramp assembly 100 that can be used, for example, to unload a wheeled article 102 from a pallet or shipping base 104. The ramp assembly 100 comprises two individual ramps 10, each being made of folded paper components. Each ramp 10 is located adjacent to the shipping base 104 so that the rear (proximal) end 55 of each ramp 10 is located under the shipping base 104 and so that each ramp 10 can accommodate a set of wheels or casters 108. Preferably the ramps 10 are placed in parallel relationship.

Figure 2:
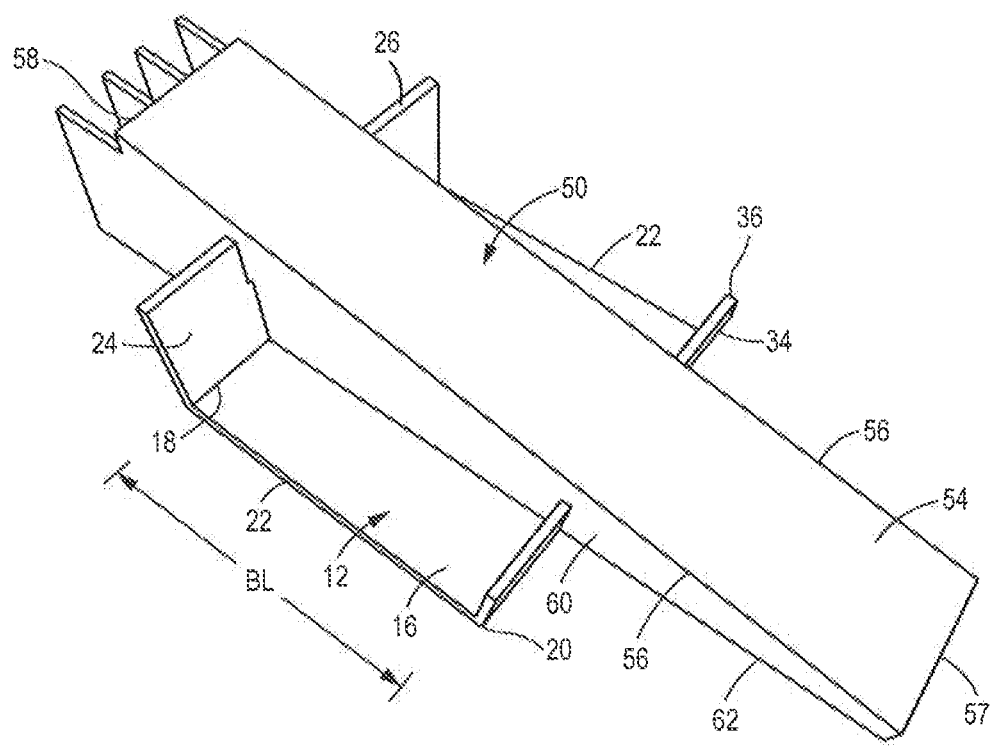
FIG. 2 is a perspective view of one of the ramps of FIG. 1, the ramp comprising a bottom member and a top member.

FIG. 2 is a perspective view of an exemplary ramp 10, like those of FIG. 1. Each ramp 10 comprises a bottom member 12 made from a first bottom member blank 14 and a top member 50 made from a top member blank 52.

Figure 3:
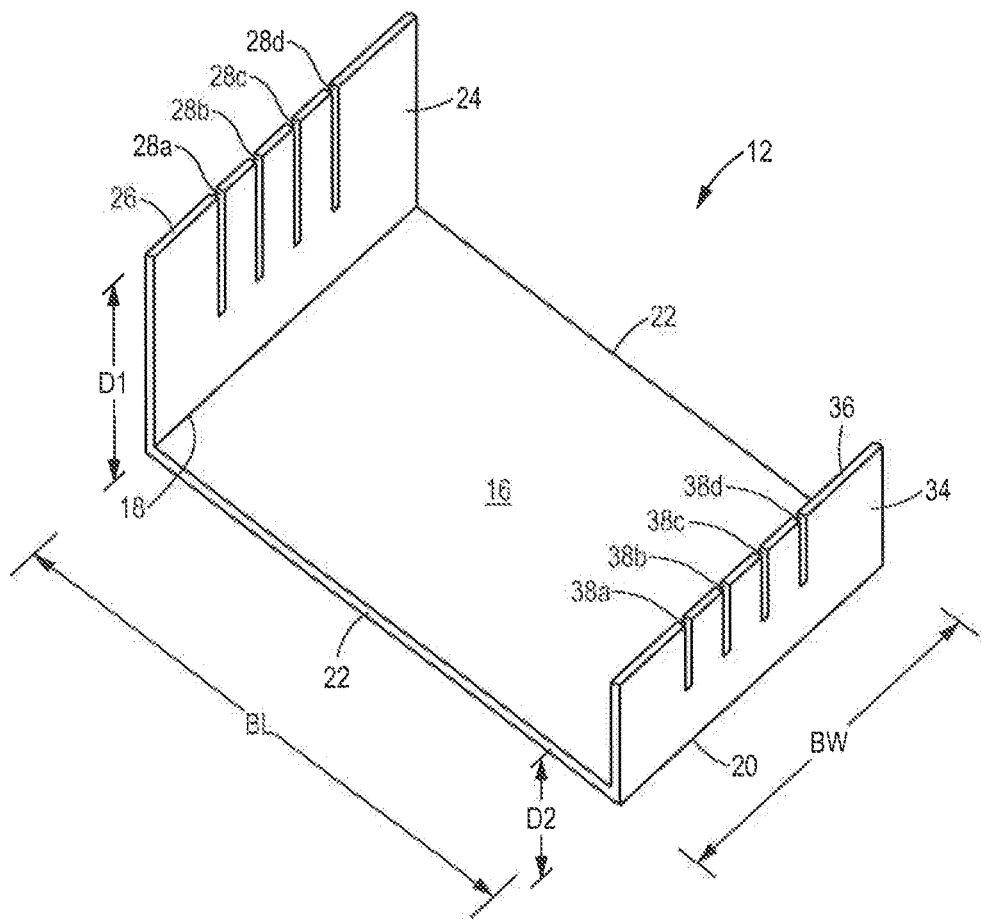
FIG. 3 is a perspective view of the bottom member of FIG. 2.

FIG. 3 is a perspective view of the bottom member 12 of FIG. 2. The bottom member 12 comprises a rectangular base panel 16 having a linear proximal edge 18 and a linear distal edge 20, the proximal and distal edges defining a base length (BL). The base panel 16 further comprises parallel opposing side edges 22 defining a base width (BW).

The terms "proximal" and "distal" as used herein generally refer to the relative spatial relationship between components, where "proximal" means closer to the palletized article 102 to be unloaded.

The bottom member 12 further comprises an integrally formed proximal panel 24 extending perpendicularly upward from the base panel 16 along the proximal edge 18 and terminating at a proximal upper edge 26.

Figure 6:
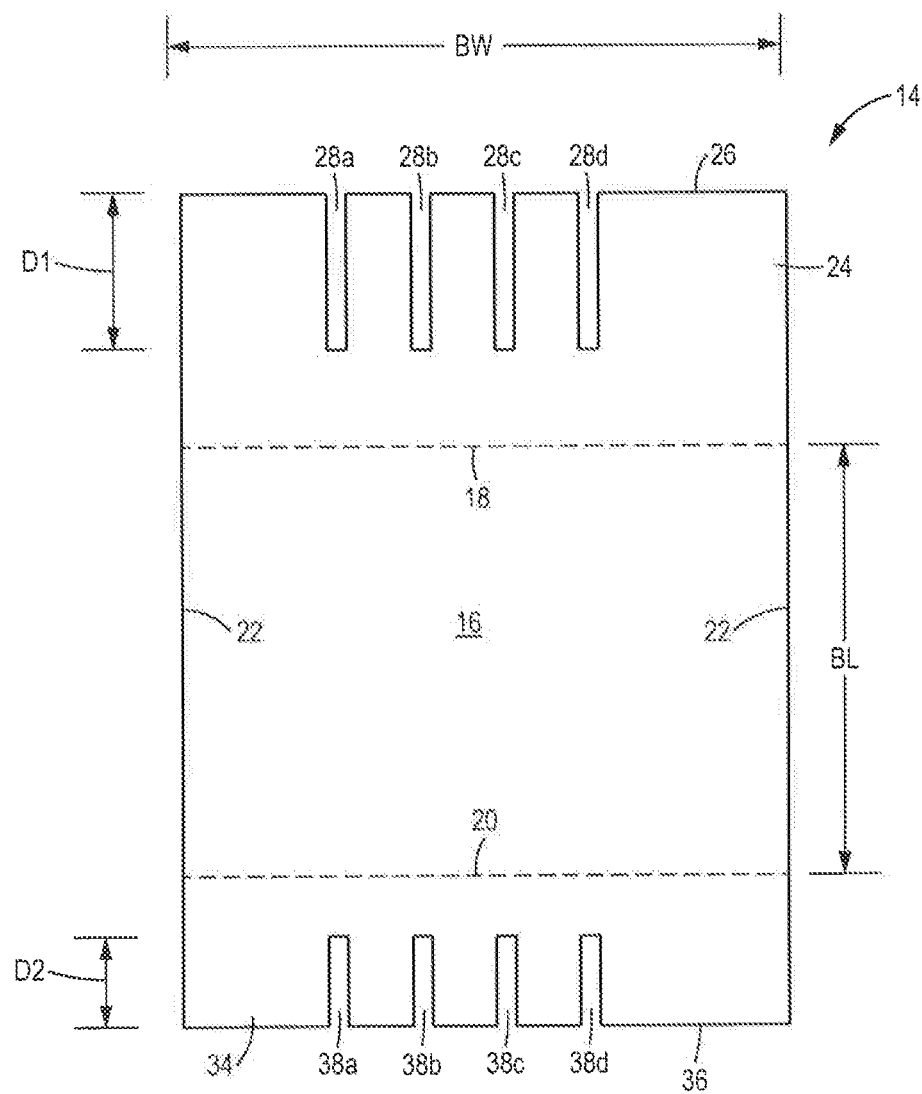
FIG. 6 is a top view of a first blank used to make the bottom member of FIG. 3.

Obscured in FIG. 2 but shown in FIG. 6, the proximal panel 24 defines four linear proximal slots 28a, 28b, 28c, 28d. In the assembled ramp 10, each proximal slot 28a, 28b, 28c, 28d extends downward a first distance (D1) from the proximal upper edge 26.

The bottom member 12 further comprises an integrally formed distal panel 34 extending perpendicularly upward from the base panel 16 along the distal edge 20 and terminating at a distal upper edge 36. Obscured in FIG. 2 but shown in FIG. 6, the distal panel 34 defines four linear distal slots 38a, 38b, 38c, 38d. In the assembled ramp 10, each distal slot 38a, 38b, 38c, 38d extends downward a second distance (D2) from the distal upper edge 36.

Figure 4:
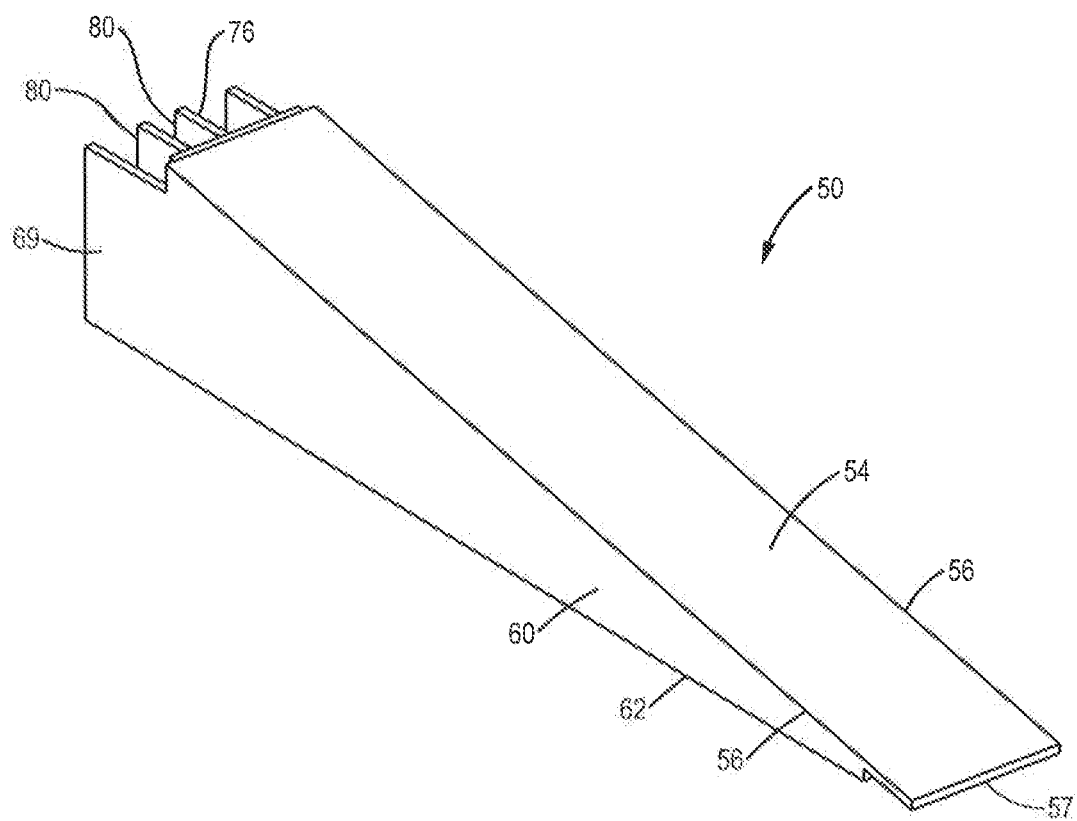
FIG. 4 is a top perspective view of the top member of FIG. 2.

FIG. 4 is a top perspective view of the top member 50 of FIG. 2. The top member 50 is a wedge shaped structure that defines an interior space. The top member 50 comprises an elongated slanted top panel 54 having opposing side edges 56, a distal edge 57 and a proximal edge 58.

The top member further comprises two vertically oriented, opposing, substantially triangular side panels 60 extending downward from the top panel 54. Each side panel 60 is foldably attached to the top panel 54 along a corresponding side edge 56. Each side panel 60 defines a first bottom edge 62. As perhaps best shown in FIG. 6, each side panel 60 comprises a substantially rectangular rear portion 64, the rear portion 64 having a upper edge 66 and extending rearward from the proximal edge 58.

Figure 5:
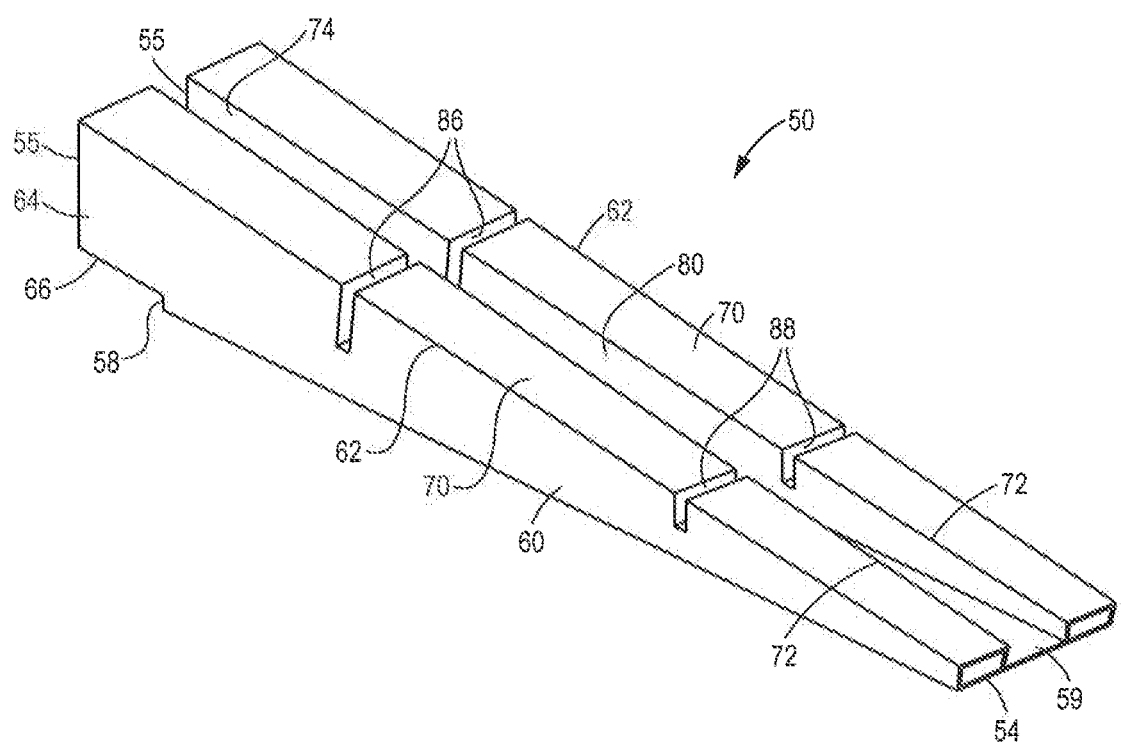
FIG. 5 is a bottom perspective view of the top member of FIG. 2.

FIG. 5 is a bottom perspective view of the top member 50 of FIG. 2. From this view it can be seen that the top member 50 further comprises a pair of horizontally oriented bottom panels 70, each hingedly attached to a side panel 60 along a first bottom edge 62 and extending to a second bottom edge 72 parallel to the first bottom edge 62. The top member 50 further comprises a pair of triangular inner support panels 80, each hingedly attached to a bottom panel 70 along a second bottom edge 72.

Figure 7:
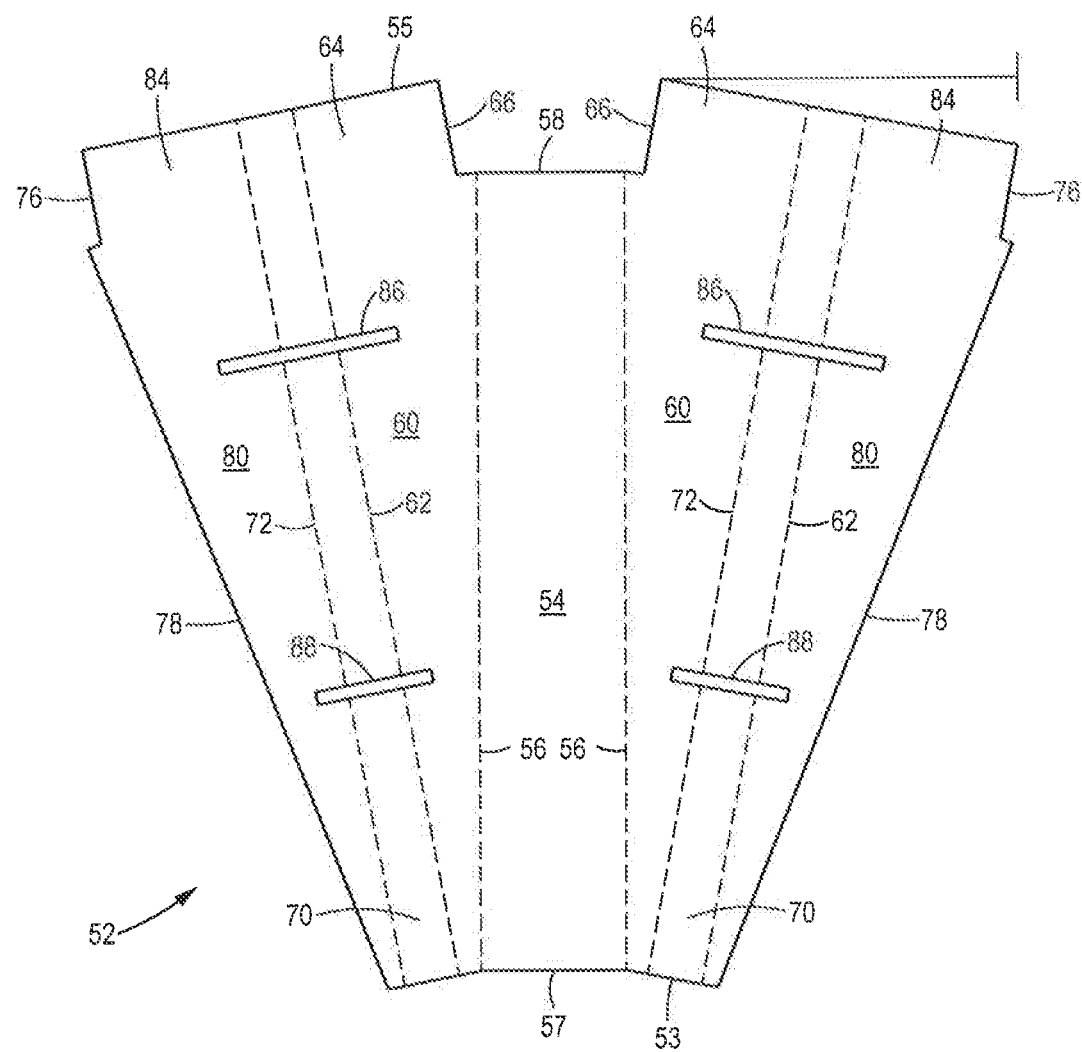
FIG. 7 is a top view of a second blank used to make the top member of FIG. 4.

As perhaps best shown in FIG. 7, each inner support panel 80 comprises a substantially rectangular second rear portion 84 extending rearward of the proximal edge 58 and having a horizontal top edge 76. Each inner support panel 80 defines a slanted top edge 78 parallel to and co-planar with the two side edges 56. The inner support panels 80 are folded inside the wedge shaped structure interior space.

The top member 50 and, more particularly, the side panels 60, bottom panels 70 and inner support panels 80, define a transverse proximal slot 86 and a transverse distal slot 88. The transverse proximal slot 86 is configured to receive and engage the proximal panel 24 of the bottom member 12 and the transverse distal slot 88 is configured to receive the distal panel 34 of the bottom member 12 such that a portion of each of the two bottom panels 70 of the top member 50 located between the proximal slot 86 and the distal slot 88 abut and rest on the base panel 16 of the bottom member 12.

Preferably the upper edge 26 of the proximal panel 24 abuts the underside 59 of the top panel 54 of the top member 50. Also, the proximal slots 86 of the top member 50 receive and engage the proximal panel 24 of the bottom member 12, while the four proximal slots 28 of the bottom member 12 receive and engage the side panels 60 and the inner support panels 80 of the top member 50. As a result, the top member 50 and the bottom member 12 are interlocked in a stationary relationship.

FIG. 6 is a top view of a first bottom member blank 14 used to make the bottom member 12 of FIG. 3. The first bottom member blank 14 comprises a rectangular base panel 16, a proximal panel 24 and a distal panel 34.

The rectangular base panel 16 has a linear proximal edge 18 and a linear distal edge 20, the proximal and distal edges defining a base length (BL), the base panel 16 further comprising parallel opposing side edges 22 defining a base width (BW).

The proximal panel 24 extends from and is foldably attached to the base panel 16 along the proximal edge 18 and terminates at a proximal upper edge 26. The proximal panel 24 defines four linear proximal slots 28a, 28b, 28c, 28d, each proximal slot 28a, 28b, 28c, 28d extending downward a first distance (D1) from the proximal upper edge 26, the first distance (D1) being less than the height of the proximal panel 24, "height" in this case being the distance between the proximal edge 18 and the proximal upper edge 26.

The distal panel 34 extends from and is foldably attached to the base panel 16 along the distal edge 20 and terminates at a distal upper edge 36. The distal panel 34 defines four linear distal slots 38a, 38b, 38c, 38d, each distal slot 38a, 38b, 38c, 38d extending downward a second distance (D2) from the distal upper edge 36, the second distance (D2) being less than the height of the distal panel 34, "height" in this case being the distance between the distal edge 20 and the distal upper edge 36.

Thus, the first bottom member blank 14 may be thought of as a piece of rectangular shaped paper-based material that includes two transverse (lateral) parallel fold lines 18, 20 and two sets of four slots extending from opposing longitudinal edges 26, 36.

FIG. 7 is a top view of a top member blank 52 used to make the top member 50 of FIG. 4. The top member blank 52 has a distal end 53 and a proximal end 55 and comprises a top panel 54, two side panels 60, two bottom panels 70 and two inner support panels 80.

The top panel 54 may be rectangular shaped and has opposing side edges 56, a distal edge 57 and a proximal edge 58.

Each side panel 60 is substantially triangular and is foldably attached to the top panel 54 along a side edge 56. Each side panel 60 defines a first bottom edge 62 extending substantially longitudinally from the distal end 53 to the proximal end 55. Each side panel 60 comprises a substantially rectangular rear portion 64 extending rearward from the proximal edge 58 of the top panel 54 having a upper edge 66.

Each bottom panel 70 is hingedly attached to a side panel 60 along the first bottom edge 62 and extends away from the side panel 60 to a second bottom edge 72 parallel to the first bottom edge 62.

Each inner support panel 80 is substantially triangular and is hingedly attached to a bottom panel 70 along a second bottom edge 72. Each inner support panel 80 comprises a substantially rectangular second rear portion 84 extending rearward of the proximal edge 58 of the top panel 54, the rectangular second rear portion 84 has a horizontal top edge 76. Each inner support panel 80 defines a slanted top edge 78 that, after the ramp 10 is assembled, is parallel to and co-planar with the two side edges 56 of the top panel 54. In the assembled ramp 10 the two inner support panels 80 are folded inside the wedge shaped structure interior space.

The top member blank 52 defines two proximal slots 86 that align in the assembled ramp 10 to form a transverse proximal slot 86 configured to cooperate with the first set of proximal slots 28 in the bottom member 12. Similarly, the top member blank 52 defines two slots 88 that align in the assembled ramp 10 to form a transverse distal slot 88 configured to cooperate with the second set of distal slots 30 in the bottom member 12 to lock the top member 50 to the bottom member 12.

Assembly of Ramp 10

Each ramp 10 may be assembled as follows:

To assemble the bottom member 12:

Fold the first bottom member blank 14 ninety degrees along proximal edge 18 until the proximal panel 24 is perpendicular to the base panel 16.

Fold the first bottom member blank 14 ninety degrees in the same direction along distal edge 20 until the distal panel 34 also is perpendicular to the base panel 16.

The resulting bottom member 12 is substantially U-shaped.

To assemble the top member 50:

Fold the top member blank 52 ninety degrees along side edges 56 so that the side panels 60 are perpendicular to the top panel 54 and parallel to each other.

Fold the top member blank 52 ninety degrees along first bottom edges 62 until the bottom panels 70 are perpendicular to the side panels 60.

Fold the top member blank 52 ninety degrees along second bottom edges 72 until the inner support panels 80 are perpendicular to the bottom panels 70.

The resulting top member 50 is substantially wedged-shaped. Tape or adhesive may be used to help the top member 50 maintain its wedge shape. In this folded configuration, each slanted top edge 78 may abut the underside 59 of the top panel 54 along the entire length of the slanted top edge 78 to provide load bearing support.

The top member 50 may now be installed onto the bottom member 12 so that the proximal slots 86 of the top member 50 cooperate with the proximal slots 28 of the bottom member 12 and so that the distal slots 88 of the top member 50 cooperate with the distal slots 38 of the bottom member 12 to lock the two components together to form the assembled ramp 10. Again, tape or adhesive may be used to help the ramp 10 maintain its wedge shape.

In the assembled ramp 10 the proximal upper edge 26 and the distal upper edge 36 of the bottom member 12 may abut the underside 59 of the top panel 54 to provide load bearing support.

In use, when the ramps 10 are positioned adjacent a palletized article, the proximal portion upper edges 66 of the first side panels 60 and the proximal portion top edges 76 of the inner support panels 80 may abut the underside 106 of the shipping base 104.

Second Embodiment—(Three Piece Ramp Assembly)

Figure 8:
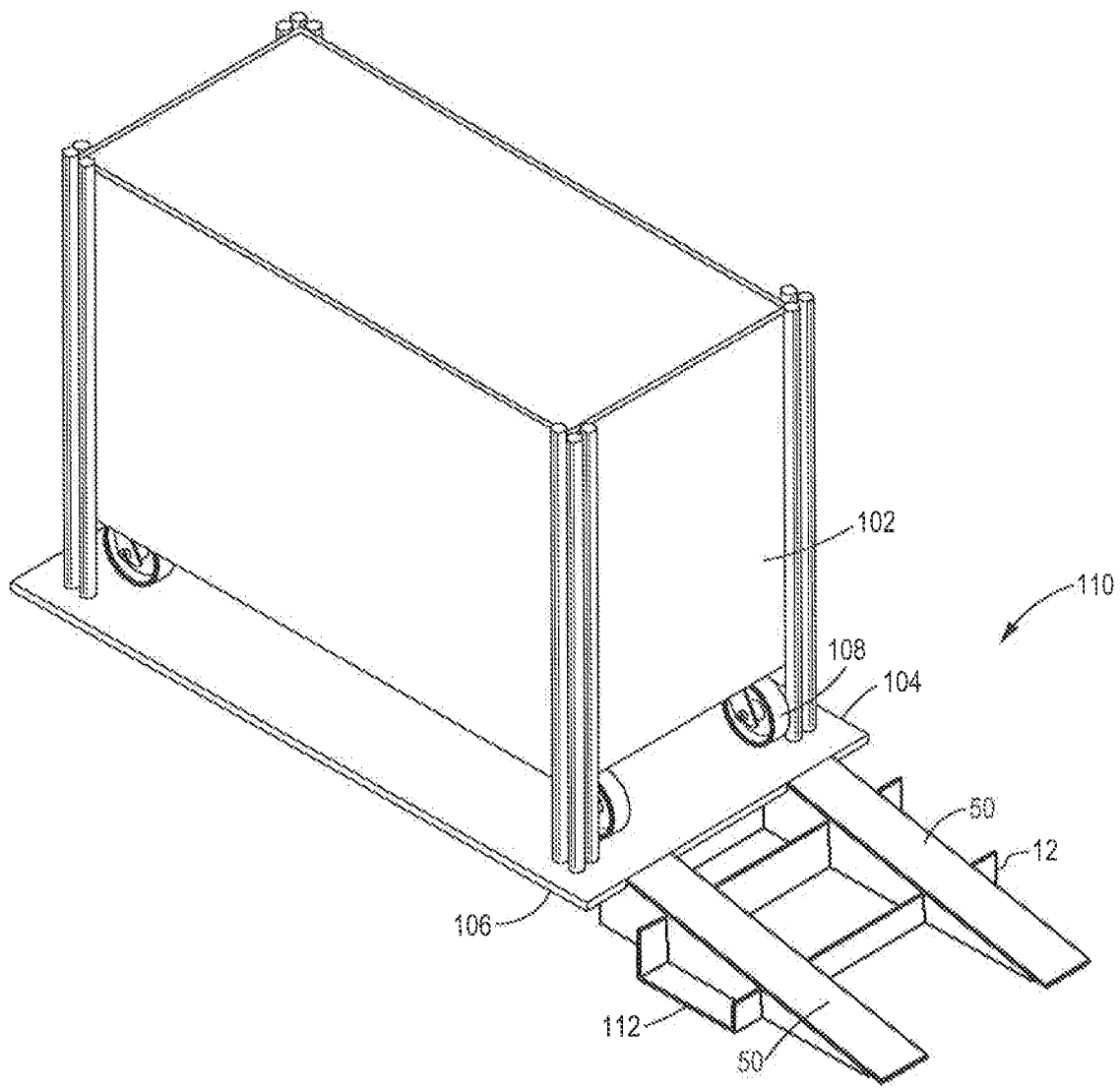
FIG. 8 is a perspective view of another ramp assembly according to the disclosure shown being used to unload an office appliance, the ramp assembly comprising a pair of top members and a single bottom member.

FIG. 8 is a perspective view of an alternative ramp assembly 110 shown being used to unload an article 102 such as an office appliance. The ramp assembly 110 comprises a pair of top members 50 substantially the same as the top member 50 described above, but only one bottom member 112.

Figure 9:
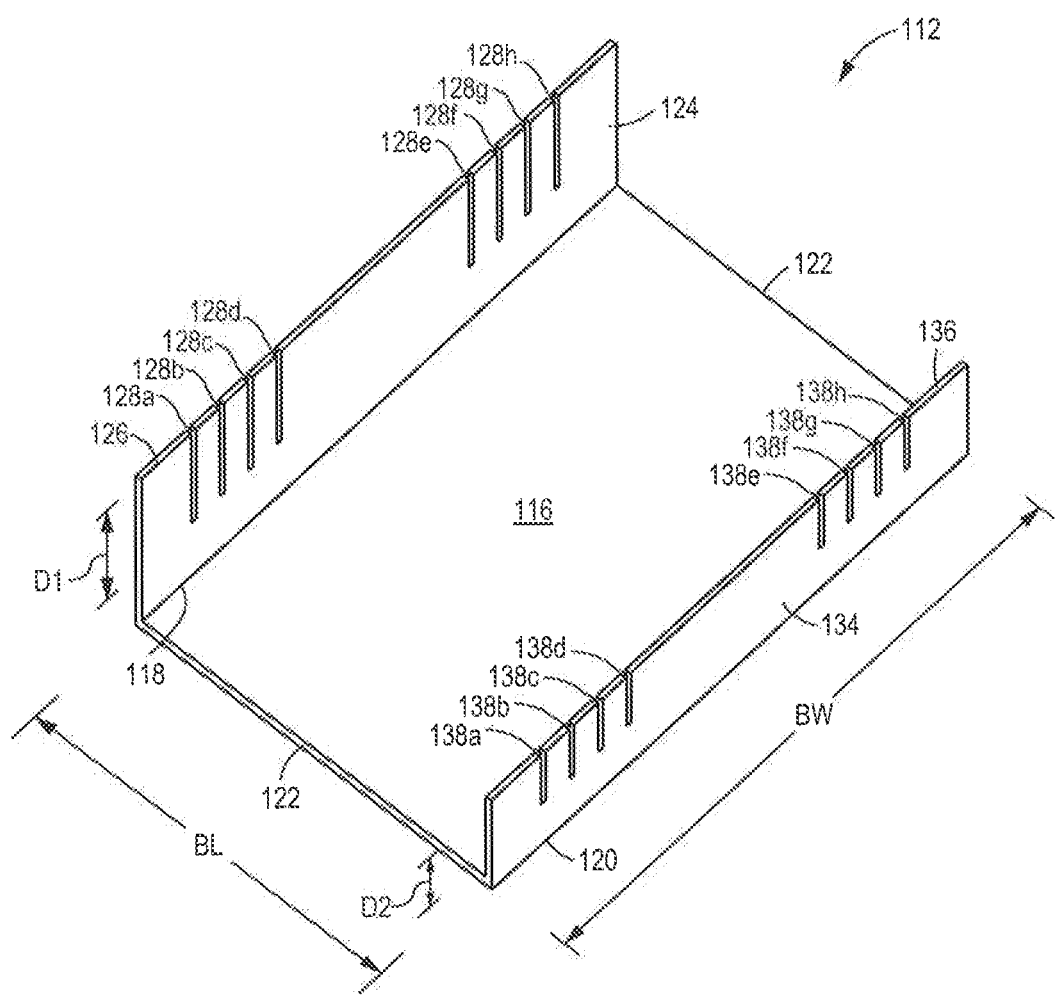
FIG. 9 is a perspective view of the bottom member of FIG. 8.

FIG. 9 is a perspective view of the bottom member 112 of FIG. 8. The bottom member 112 comprises a rectangular base panel 116 having a linear proximal edge 118 and a linear distal edge 120, the proximal and distal edges defining a base length (BL). The base panel 116 further comprises parallel opposing side edges 122 defining a base width (13W).

The bottom member 112 further comprises an integrally formed proximal panel 124 extending perpendicularly upward from the base panel 116 along the proximal edge 118 and terminating at a proximal upper edge 126.

The proximal panel 124 defines two sets of four linear proximal slots 128, each set configured to receive and engage the proximal panel 24 of a first top member 50 or a second top member 50. Thus, a first set 128 of slots 128a, 128b, 128c and 128d are configured to receive and engage the proximal panel 24 of a first top member 50, and a second set of slots 128e, 128f, 128g and 128h are configured to receive and engage proximal panel 24 of a second top member 50. In the assembled ramp assembly 110, each proximal slot 128 extends downward a first distance (D1) from the proximal upper edge 126.

The bottom member 112 further comprises an integrally formed distal panel 134 extending perpendicularly upward from the base panel 116 along the distal edge 120 and terminating at a distal upper edge 136. Similar to the proximal panel 124, the distal panel 134 defines two sets of four linear distal slots 138, each set configured to receive and engage the distal panel 34 of a first top member 50 or a second top member 50. Thus, a first set 138 of slots 138a, 138b, 138c and 138d are configured to receive the distal panel of a first top member 50, and a second set of slots 138e, 138f, 138g and 138h are configured to receive the distal panel 34 of a second top member 50. In the assembled ramp assembly 110, each distal slot 138 extends downward a second distance (D2) from the proximal upper edge 136.

Figure 10:
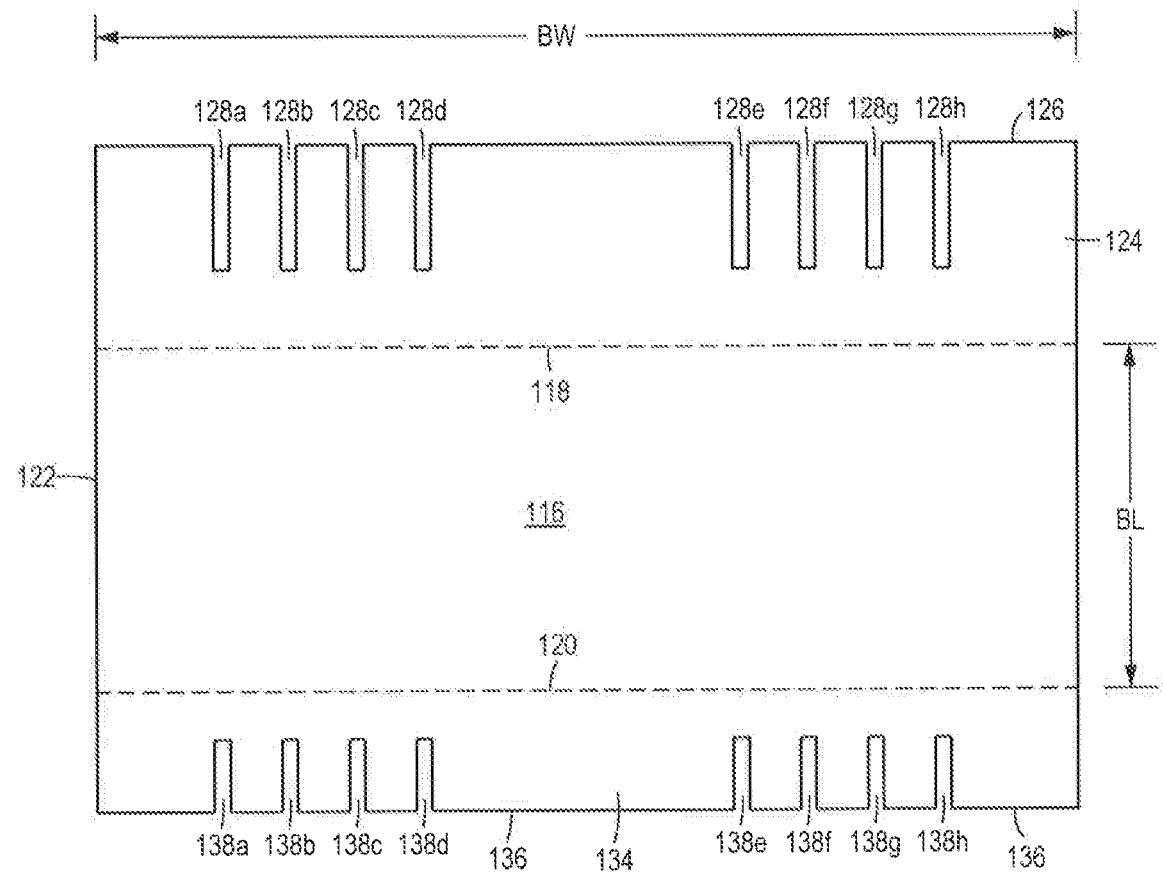
FIG. 10 is a top view of a third blank used to make the bottom member of FIG. 9.

FIG. 10 is a top view of the second bottom member blank 114 used to make the bottom member 112 of FIG. 8. The second bottom member blank 114 comprises a rectangular base panel 116, a proximal panel 124 and a distal panel 134.

The rectangular base panel 116 has a linear proximal edge 118 and a linear distal edge 120, the proximal and distal edges defining a base length (BL). The base panel 116 further comprises parallel opposing side edges 122 defining a base width (BW).

The proximal panel 124 extends from and is foldably attached to the base panel 116 along the proximal edge 118 and terminates at a proximal upper edge 126. The proximal panel 124 defines two sets of four linear proximal slots 128, each proximal slot 128 extending a first distance (D1) from the proximal upper edge 126, the first distance (D1) being less than the height of the proximal panel 124.

The distal panel 134 extends from and is foldably attached to the base panel 116 along the distal edge 120 and terminates at a distal upper edge 136. The distal panel 134 defines two sets of four linear distal slots 138, each distal slot 13 extending a second distance (D2) from the distal upper edge 136, the second distance (D2) being less than the height of the distal panel 134.

Thus, the second bottom member blank 114 may be thought of as a piece of rectangular shaped paper-based material that includes two parallel transverse (lateral) fold lines 118, 120 and four sets of four slots each extending downward from the proximal upper edge 126 and the distal upper edge 136.

Assembly of Ramp Assembly 110

The ramp assembly 110 of FIG. 7 may be assembled as follows:

To assemble the bottom member 112:

Fold the second bottom member blank 114 ninety degrees along proximal edge 118 until the proximal panel 124 is perpendicular to the base panel 116.

Fold the second bottom member blank 114 ninety degrees in the same direction along distal edge 120 until the distal panel 134 also is perpendicular to the base panel 16.

The resulting bottom member 112, shown in FIG. 8, is substantially U-shaped.

Each top member 50 may be assembled as described above with respect to the first embodiment. Each resulting top member 50 is substantially wedged-shaped. Tape or adhesive may be used to help the top member 50 maintain its wedge shape.

The two top members 50 may now be installed onto the bottom member 112 as described above so that the proximal slots 86 of the top member 50 receive and engage the proximal panel 124 of the bottom member 112 and so that the distal slots 88 of the top member 50 receive and engage the distal panel 134 of the bottom member 112 to lock the components together to form the ramp assembly 110. Tape or adhesive may be used to help each top member 50 maintain its wedge shape.

In use, when the ramp assembly 110 is positioned adjacent a palletized article, for each top member 50, the proximal portion upper edges 66 of the first side panels 60 and the proximal portion top edges 76 of the inner support panels 80 may abut the underside 106 of the shipping base 104.

Third Embodiment—(One Piece Ramp Assembly)

Figure 11:
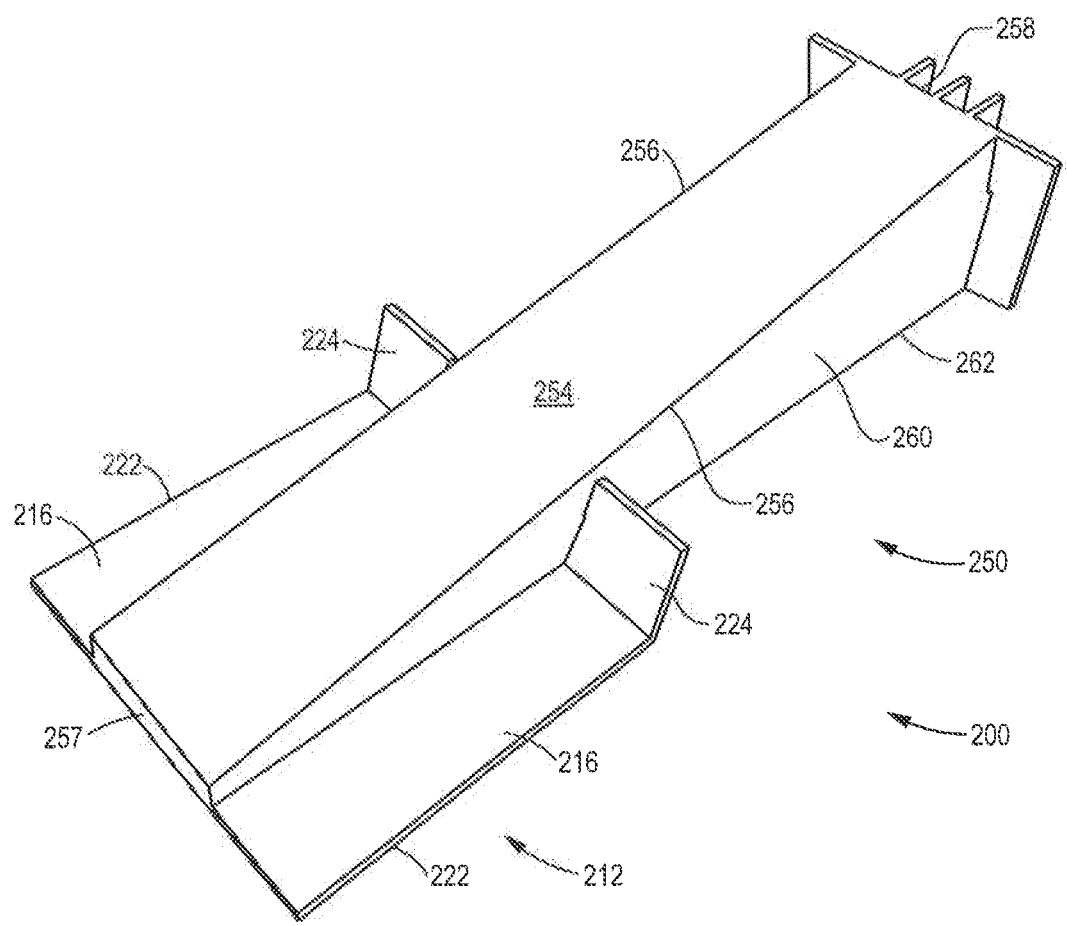
FIG. 11 is a perspective view of a one piece ramp according to the disclosure shown.

FIG. 11 is a perspective view of a one piece ramp 200 according to the disclosure. The ramp 200 comprises a bottom portion 212 and a top portion 250 connected by a narrow connecting panel 240. All portions—bottom portion 212, top portion 250 and connecting panel 240—are made from a single unitary blank 252.

The bottom portion 212 comprises a rectangular base panel 216 having a linear proximal edge 218 and a linear distal edge 220, the proximal and distal edges defining a base length (BL). The base panel 216 further comprises parallel opposing side edges 222 defining a base width (BW).

The bottom portion 212 further comprises an integrally formed vertical panel 224 extending perpendicularly upward from the base panel 216 along the proximal edge 218 and terminating at a proximal upper edge 226. Obscured in FIG. 11 but shown in FIG. 13, the vertical panel 224 defines four linear proximal slots 228a, 228b, 228c, 228d. In the assembled ramp 200, each proximal slot 228a, 228b, 228c, 228d extends downward a first distance (D1) from the proximal upper edge 226.

Still referring to FIG. 11, the top portion 250 is a wedge shaped structure that defines an interior space. The top portion 250 comprises an elongated slanted top panel 254 having opposing side edges 256, a distal edge 257 and a proximal edge 258. Extending downward from the distal edge 257 is a connecting panel 240 connecting the top panel 254 to the base panel 216. The connecting panel 240 is foldably connected to the base panel 216 by a fold line 230.

The top portion 250 further comprises two vertically oriented, opposing, substantially triangular side panels 260 extending downward from the top panel 254. Each side panel 260 is foldably attached to the top panel 254 along a corresponding side edge 256. Each side panel 260 defines a first bottom edge 262. As perhaps best shown in FIG. 12, each side panel 260 comprises a substantially trapezoidal rear portion 264. The rear portion 264 has a top edge 266 and is partially separated from the main portion of the side panel 260 by a proximal slot 279.

The top portion 250 further comprises a proximal locking panel 290 integrally and foldably connected to the top panel 254 along the proximal (rear) edge 258. The locking panel 290 extends vertically downward from the top panel 254. The locking panel 290 may be substantially rectangular and may comprise four slots 292 extending upward from a bottom edge 294. The slots 292 are aligned with the slots 279 in the side panels 260 and are configured to receive and engage the side panels 260 and the inner support panels 280.

Figure 12:
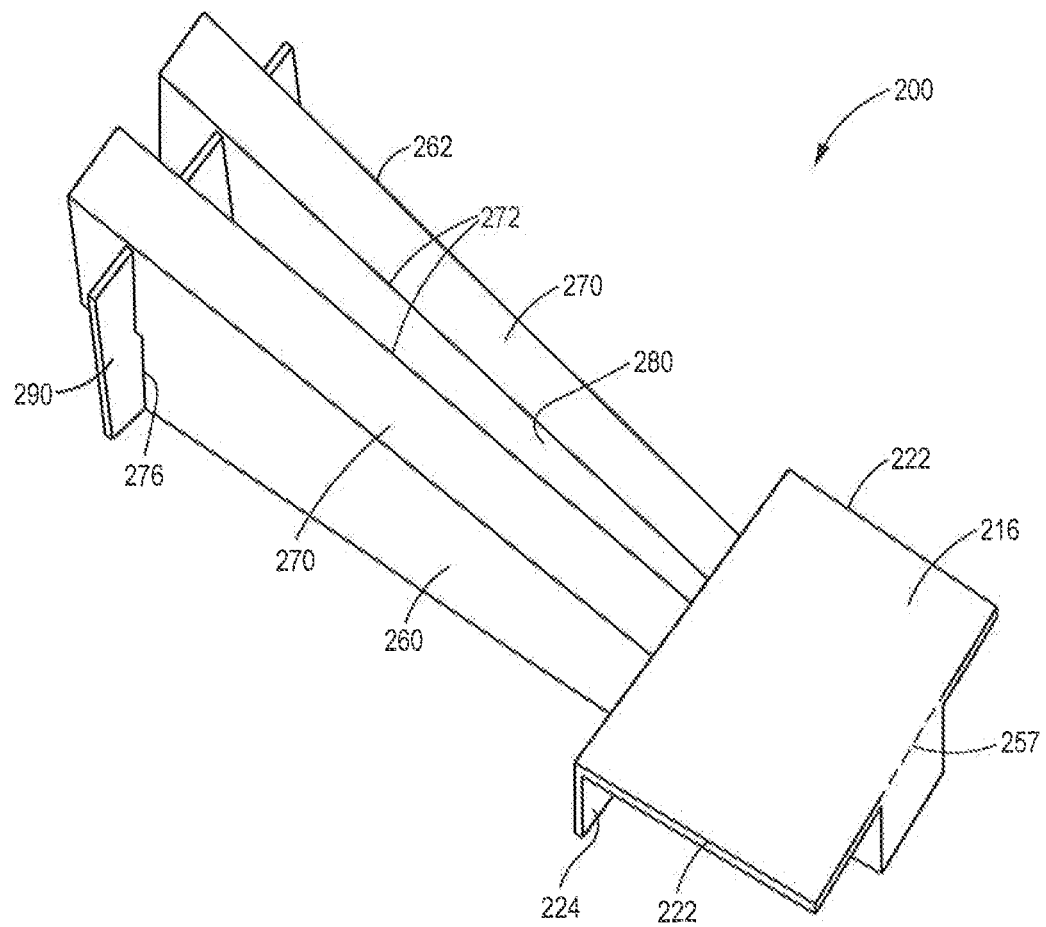
FIG. 12 is a bottom perspective view of the top member of FIG. 11.

FIG. 12 is a bottom perspective view of the ramp 200 of FIG. 11. From this view it can be seen that the top portion 250 of the ramp 200 further comprises a pair of horizontally oriented bottom panels 270, each hingedly attached to a side panel 260 along the first bottom edge 262 and extending to a second bottom edge 272 parallel to the first bottom edge 262.

The top portion 250 further comprises a pair of triangular inner support panels 280, each hingedly attached to a bottom panel 270 along a second bottom edge 272. As perhaps best shown in FIG. 13, each inner support panel 280 may comprise an irregularly shaped second rear portion 284 extending rearward of the main part of the inner support panel 280 and separated from the main part of the inner support panel 280 by a slot 277. The inner support panels 280 are folded inside the wedge shaped structure interior space.

The top portion 250 and, more particularly, the side panels 260, bottom panels 270 and inner support panels 280, define transverse slots 286. The transverse slots 286 are configured to receive the vertical panel 224 of the bottom portion 212 such that a portion of each of the two bottom panels 270 abuts and rests on the base panel 216 of the bottom portion 212.

Preferably the upper edge 226 of the vertical panel 224 abuts the underside of the top panel 254. Also, the slots 286 of the top portion 250 receive and engage the vertical panel 224, while the four proximal slots 228 of the vertical panel 224 receive and engage the side panels 260 and the inner support panels 280.

Figure 13:
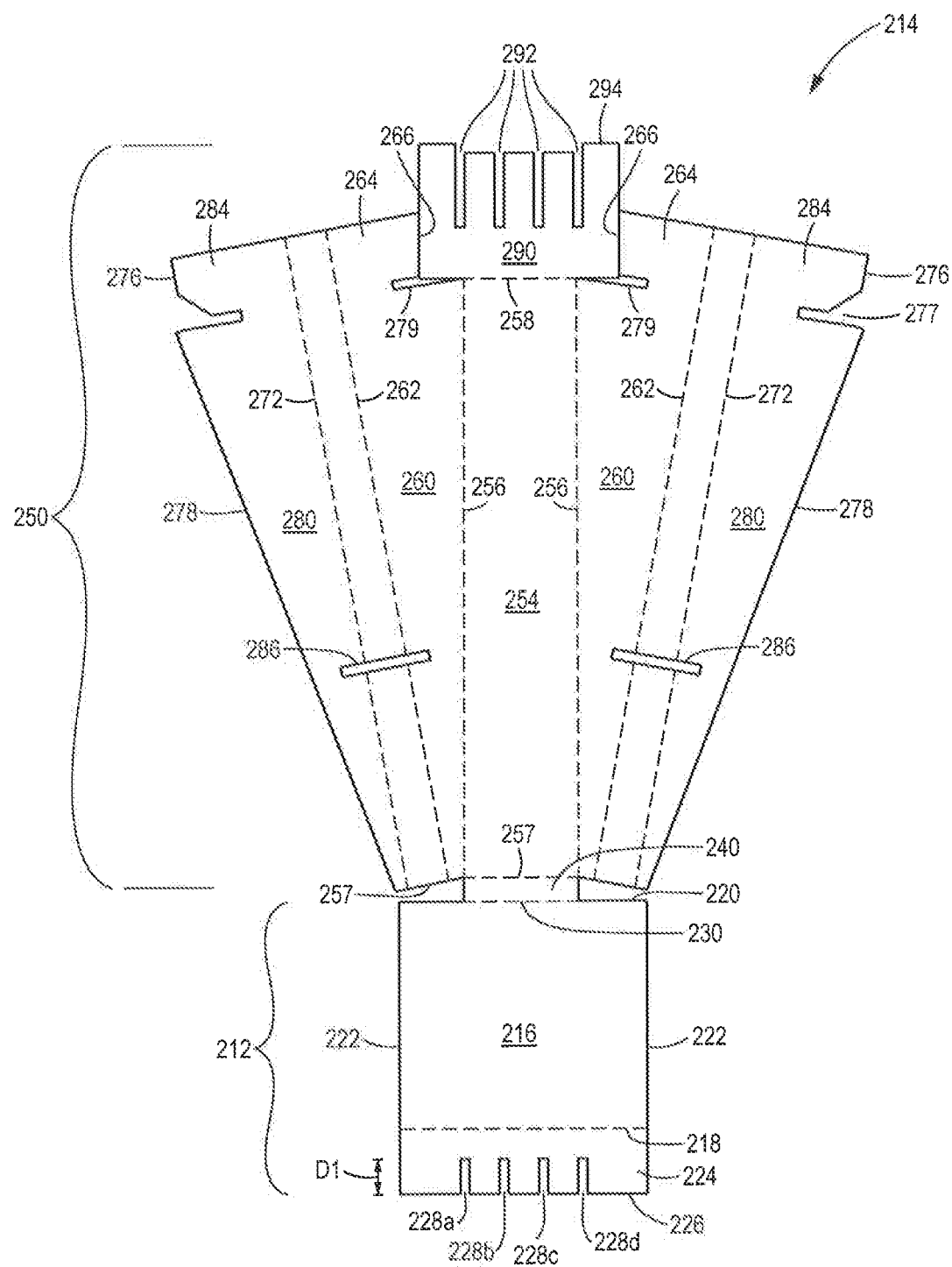
FIG. 13 is a top view of a blank used to make the one piece ramp of FIG. 11.

FIG. 13 is a top view of the blank 214 used to make the one piece ramp 200 of FIGS. 11 and 12. The blank 214 comprises a bottom portion 212 and a top portion 250 connected by the connecting panel 240. All portions—bottom portion 212, top portion 250 and connecting panel 240—are made from this blank 252.

The bottom portion 212 comprises a rectangular base panel 216 having a linear proximal edge 218 and a linear distal edge 220, the proximal and distal edges defining a base length (BL). The bottom portion 212 further comprises an integrally formed vertical panel 224 extending from the base panel 216 along the fold line edge 218 and terminating at a free proximal upper edge 226. The vertical panel 224 defines four linear proximal slots 228a, 228b, 228c, 228d communicating with the proximal upper edge 226. Each proximal slot 228a, 228b, 228c, 228d extends downward a first distance (D1) from the proximal upper edge 226.

The top portion 250 comprises an elongated slanted top panel 254 having opposing side edges 256, a distal edge 257 and a proximal edge 258. Extending from the distal edge 257 is a panel 240 connecting the top panel 254 to the base panel 216. The connecting panel 240 is foldably connected to the base panel 216 by the fold line 230.

The top portion 250 further comprises two vertically oriented, opposing, substantially triangular side panels 260 extending from the top panel 254. Each side panel 260 is foldably attached to the top panel 254 along a corresponding side edge 256. Each side panel 260 defines a first bottom edge 262. Each side panel 260 comprises a main portion and a substantially trapezoidal rear portion 264. The rear portion 264 has a free edge 266 and is partially separated from the main portion of the side panel 260 by a proximal slot 279.

The top portion 250 further comprises a proximal locking panel 290 integrally and foldably connected to the top panel 254 along the rear (proximal) edge 258. The locking panel 290 extends from and is foldably attached to the top panel 254. The locking panel 290 may be substantially rectangular and may comprise four slots 292 extending from a free bottom edge 294.

The top portion 250 further comprises a pair of horizontally oriented bottom panels 270, each hingedly attached to a side panel 260 along the first bottom edge 262 and extending to a second bottom edge 272 parallel to the first bottom edge 262.

The top portion 250 further comprises a pair of substantially triangular inner support panels 280, each hingedly attached to a bottom panel 270 along a second bottom edge 272. Each inner support panel 280 comprises an irregularly shaped second rear portion 284 extending rearward of the proximal edge 258 and separated from the main part of the inner support panel by a slot 277.

The side panels 260, bottom panels 270 and inner support panels 280, define transverse slots 286, the purpose of which is described elsewhere.

Assembly

The ramp 200 may be assembled in the following manner:

Fold the blank 252 ninety degrees along side edges 256 so that the side panels 260 are perpendicular to the top panel 254 and parallel to each other.

Fold the top member blank 252 another ninety degrees along first bottom edges 262 until the bottom panels 270 are perpendicular to the side panels 260.

Fold the top member blank 52 another ninety degrees along second bottom edges 272 until the inner support panels 280 are perpendicular to the bottom panels 270. Tape or adhesive may be used to help the top portion 250 maintain its wedge shape. In this partially folded configuration, each slanted top edge 278 may abut the underside 259 of the top panel 254 along the entire length of the slanted top edge 278 to provide load bearing support.

Next, fold the blank 214 along fold line 218 ninety degrees until the vertical panel 224 is perpendicular to the base panel 216.

Fold the blank 214 along fold line 257 ninety degrees downward until the connecting panel 240 is perpendicular to the slanted top panel 254.

Fold the blank along fold line 230 until the base panel 216 is flush against the bottom panels 270. In this configuration the vertical panel 224 should be received within the slot 286 and the slots 228 of the vertical panel 224 should receive and engage the side panels 260 and the inner support panels 280.

Finally, fold the blank 214 down along fold line 258 until proximal locking panel 290 extends vertically downward. In this configuration the slots 292 should be aligned with the slots 279 in the side panels 260 and the slots 277 in the inner support panels 280 and should receive and engage the side panels 260 and the inner support panels 280.

In the assembled ramp 200 the proximal upper edge 226 and the may abut the underside 259 of the top panel 254 to provide load bearing support.

In use, two ramps 200 may be positioned adjacent a palletized article 102 so that the proximal portion upper edges 266 of the first side panels 260 and the proximal portion upper edges 276 of the inner support panels 280 abut the underside 106 of the shipping base 104, similar to the positioning shown in FIGS. 1 and 8. Alternatively, it is contemplated that one large ramp 200 could be used to offload a palletized article 102.

Optionally, an outer support panel 390 (not shown) can be hingedly attached to each inner support panel 280 along the slanted top edge 278. Each outer support panel 390 may be substantially a mirror image of the inner support panel 280 to which it is directly attached. That is, each outer support panel 390 may be substantially triangular and comprise a substantially rectangular second rear portion 394 extending rearward of the proximal edge 258 of the top panel 254, the rectangular second rear portion 394 having a horizontal top edge 398. Each outer support panel 390 may define a bottom edge 396 that, after the ramp 200 is assembled, abuts the bottom panel 370. In the assembled ramp 200 each outer support panel 390 is folded 180 degrees along the horizontal top edge 278 so that the outer support panel 390 is in flat facing abutment with a corresponding inner panel 280 and folded inside the wedge shaped structure interior space.

Fourth Embodiment—(Two Piece Reinforced Ramp)

Figure 14:
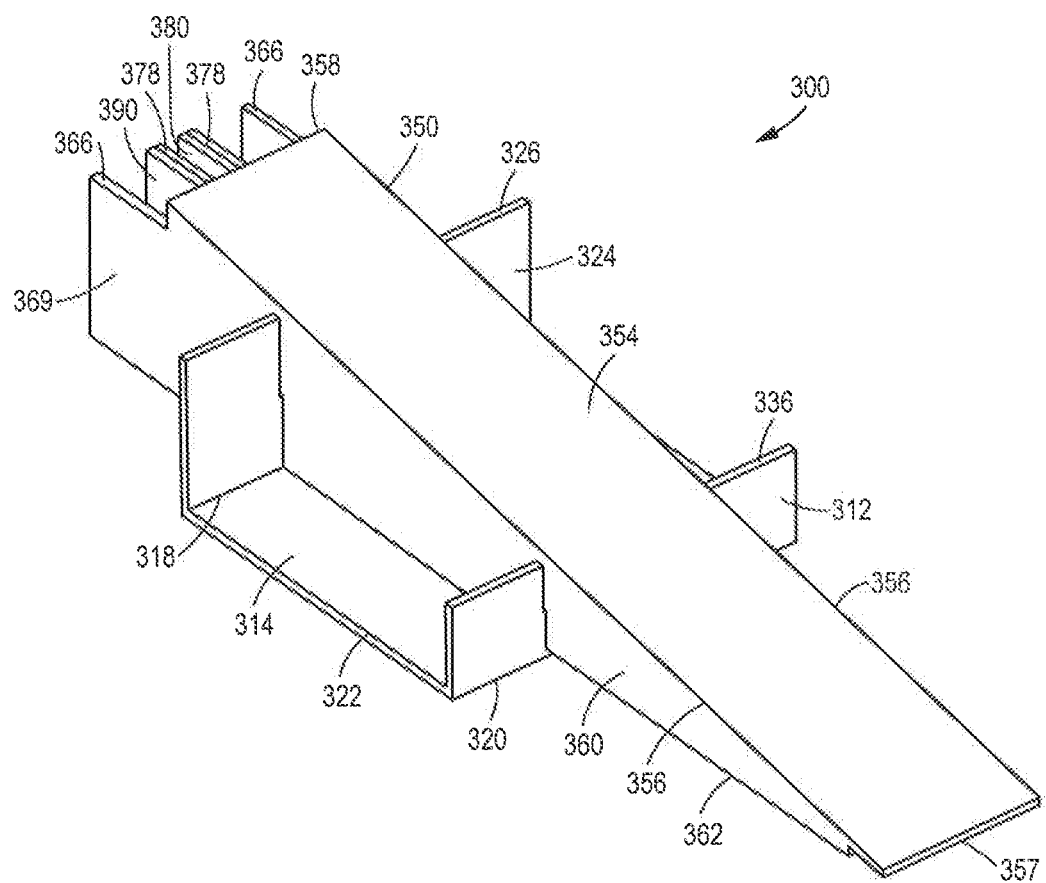
FIG. 14 is a perspective view of a two piece reinforced ramp according to the disclosure, the ramp comprising a top member and a bottom member.

FIG. 14 is a perspective view of a two piece reinforced ramp 300 according to the disclosure. The ramp 300 comprises a bottom member 312 made from a bottom member blank 314 and a top member 350 made from a top member blank 352.

Figure 15:
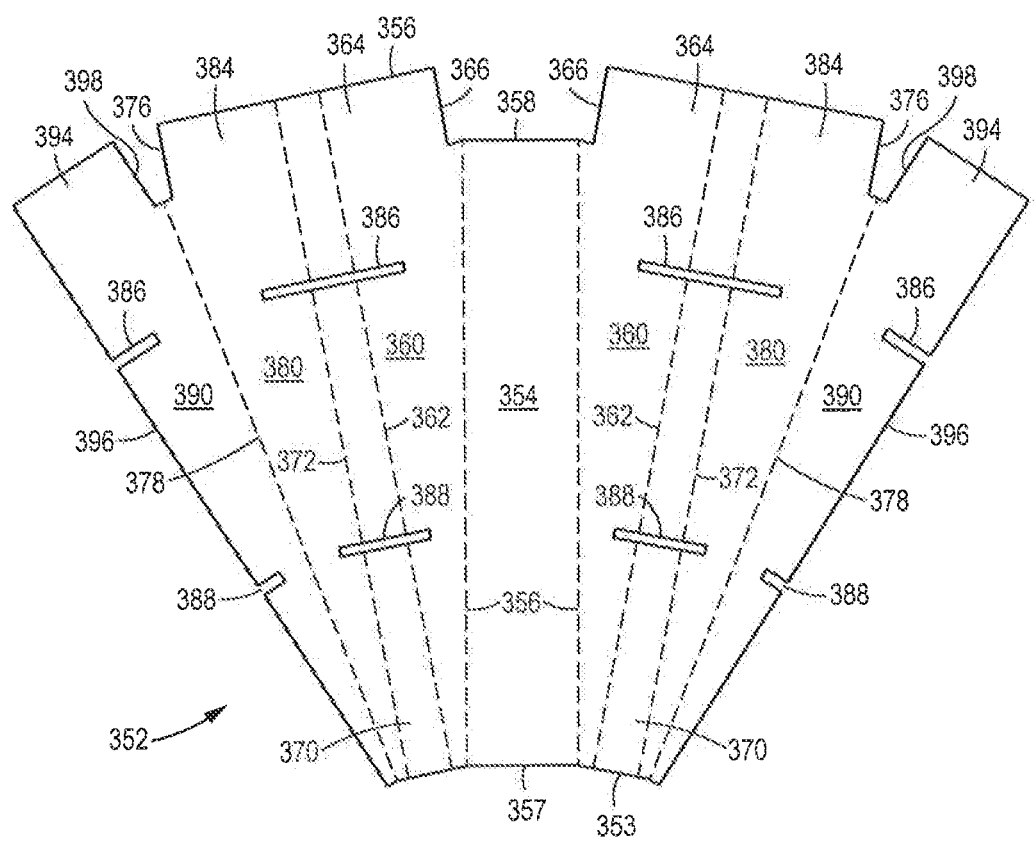
FIG. 15 is a top view of a top member blank used to make the top member of FIG. 14.

FIG. 15 is a top view of a top member blank 352 used to make the top member 350 of FIG. 14. The top member blank 352 has a distal end 353 and a proximal end 355 and comprises a top panel 354, two side panels 360, two bottom panels 370, two inner support panels 380 and two outer support panels 390.

The top panel 354 may be rectangular shaped and has opposing side edges 356, a distal edge 357 and a proximal edge 358.

Each side panel 360 is substantially triangular and is foldably attached to the top panel 354 along a side edge 356. Each side panel 360 defines a first bottom edge 362 extending substantially longitudinally from the distal end 353 to the proximal end 355. Each side panel 360 comprises a substantially rectangular proximal portion 364 extending rearward from the proximal edge 358 of the top panel 354 and has an top edge 366.

Each bottom panel 370 is hingedly attached to a side panel 360 along the first bottom edge 362 and extends away from the side panel 360 to a second bottom edge 372 parallel to the first bottom edge 362.

Each inner support panel 380 is substantially triangular and is hingedly attached to a bottom panel 370 along a second bottom edge 372. Each inner support panel 380 comprises a substantially rectangular second rear portion 384 extending rearward of the proximal edge 358 of the top panel 354, the rectangular second rear portion 384 having a horizontal top edge 376. Each inner support panel 380 defines a slanted top edge 378 that, after the ramp 300 is assembled, is parallel to and co-planar with the two side edges 356 of the top panel 354. In the assembled ramp 300 the two inner support panels 380 are folded inside the wedge shaped structure inferior space.

Each outer support panel 390 is hingedly attached to a corresponding inner support panel 380 along a slanted top edge 378. Each outer support panel 390 is substantially a mirror image of the inner support panel 380 to which it is directly attached. That is, each outer support panel 390 is substantially triangular and comprises a substantially rectangular second rear portion 394 extending rearward of the proximal edge 358 of the top panel 354, the rectangular second rear portion 394 having a horizontal top edge 398. Each outer support panel 390 defines a bottom edge 396 that, after the ramp 300 is assembled, abuts a bottom panel 370. In the assembled ramp 300 each outer support panel 380 is folded 180 degrees along the horizontal top edge 376 so that the outer support panel 390 is in flat facing abutment with a corresponding inner support panel 380 and folded inside the wedge shaped structure interior space.

The top member blank 352 defines two proximal slots 386 that align in the assembled ramp 300 to form a transverse proximal slot 386 configured to cooperate with a first set 328 of proximal slots in the bottom member 312. Similarly, the top member blank 352 defines two distal slots 388 that align in the assembled ramp 300 to form a transverse distal slot 388 configured to cooperate with a second set of distal slots 330 in the bottom member 312 to lock the top member 350 to the bottom member 312.

Figure 16:
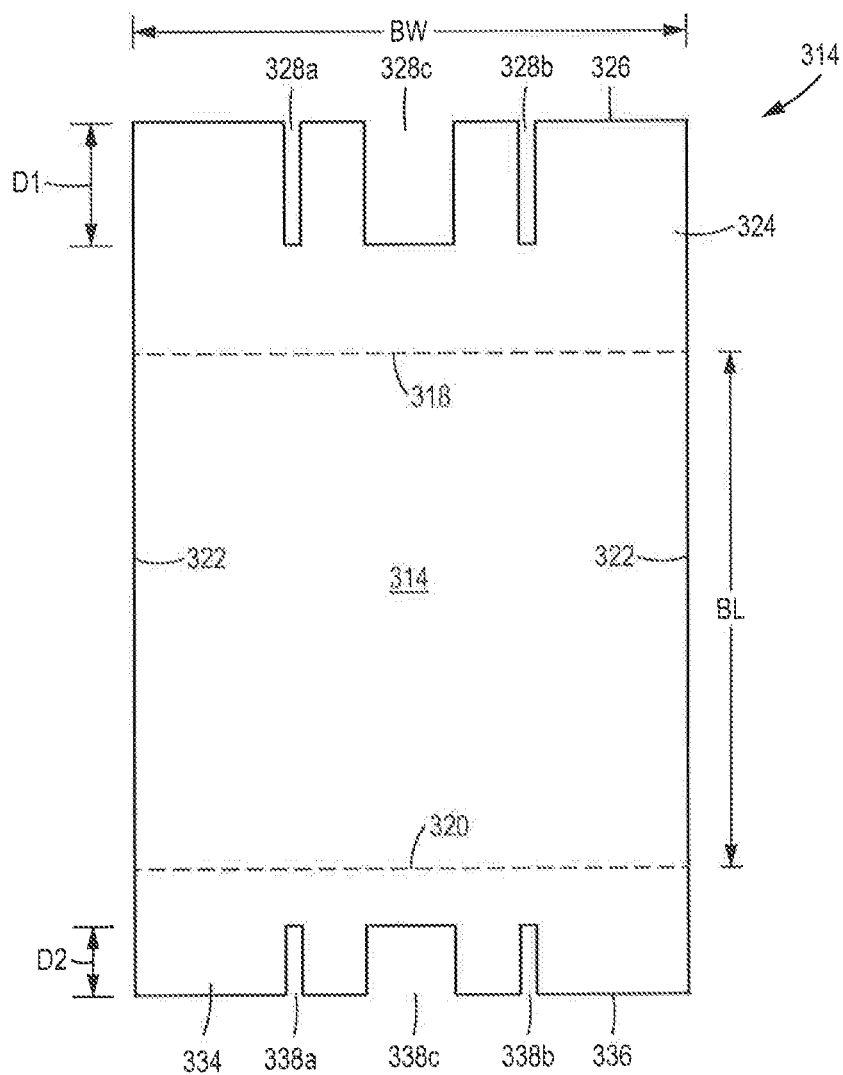
FIG. 16 is a top view of a bottom member blank used to make the bottom member of FIG. 14.

FIG. 16 is a top view of a bottom member blank 314 used to make the bottom member 312 of FIG. 14. The bottom member blank 314 comprises a rectangular base panel 316, a proximal panel 324 and a distal panel 334.

The rectangular base panel 316 has a linear proximal edge 318 and a linear distal edge 320, the distance between the proximal and distal edges defining a base length (BL), the base panel 316 further comprising parallel opposing side edges 322 defining a base width (BW).

The proximal panel 324 extends from and is foldably attached to the base panel 316 along the proximal edge 318 and terminates at a proximal upper edge 326. The proximal panel 324 defines two outer proximal slots 328a, 328b separated by a middle proximal slot 328c, each proximal slot 328a, 328b, 328c extending downward a first distance (D1) from the proximal upper edge 326, the first distance (D1) being less than the height of the proximal panel 324, "height" in this case being the distance between the proximal edge 318 and the proximal upper edge 326.

The distal panel 334 extends from and is foldably attached to the base panel 316 along the distal edge 320 and terminates at a distal upper edge 336. The distal panel 334 defines two outer distal slots 38a, 38b and a middle distal slot 38c, each distal slot 38a, 38b, 38c extending downward a second distance (D2) from the distal upper edge 336, the second distance (D2) being less than the height of the distal panel 334, "height" in this case being the distance between the distal edge 320 and the distal upper edge 336.

In an alternative, one or both middle distal slots 328c, 338c can be replaced with two separate slots 38b, 38c as in the embodiment shown in FIG. 6.

Thus, the bottom member blank 314 may be thought of as a piece of rectangular shaped paper-based material that includes two transverse (lateral) parallel fold lines 318, 320 and two sets of three or four slots extending from the laterally oriented proximal upper edge 326 and distal upper edge 336.

Assembly of Ramp 300

The reinforced ramp 300 may be assembled as follows:
To assemble the bottom member 312:
Fold the bottom member blank 314 ninety degrees along the proximal edge 318 until the proximal panel 324 is perpendicular to the base panel 316.

Fold the bottom member blank 314 ninety degrees in the same direction along distal edge 320 until the distal panel 334 also is perpendicular to the base panel 316.

The resulting bottom member 312 is substantially U-shaped.

To assemble the top member 350:
Fold the top member blank 352 ninety degrees along side edges 356 so that the side panels 360 are perpendicular to the top panel 354 and parallel to each other.

Fold the top member blank 352 ninety degrees along first bottom edges 362 until the bottom panels 370 are perpendicular to the side panels 360.

Fold the top member blank 352 ninety degrees along second bottom edges 372 until the inner support panels 380 are perpendicular to the bottom panels 370.

Fold the top member blank 352 180 degrees along slanted top ends 378 until the outer support panels 390 are in flat facing abutment with the inner support panels 380.

The resulting structure 350 is substantially wedged-shaped. Tape or adhesive may be used to help the top member 350 maintain its wedge shape. In this folded configuration, each of the slanted top edges 378 may abut the underside 359 of the top panel 354 along the entire length of the slanted top edges 378 to provide load bearing support. In addition, each of the bottom edges 396 may abut a bottom panel 370 to provide extra load bearing support.

The top member 350 may now be installed onto the bottom member 312 so that the proximal slots 386 of the top member 350 cooperate with the proximal slots 328 of the bottom member 312 and so that the distal slots 388 of the top member 350 cooperate with the distal slots 338 of the bottom member 312 to lock the two components together to form the assembled ramp 300. Again, tape or adhesive may be used to help the ramp 300 maintain its wedge shape.

In the assembled ramp 300 the proximal upper edge 326 and the distal upper edge 336 of the bottom member 312 may abut the underside 359 of the top panel 354 to provide load bearing support.

In use, when two of the reinforced ramps 300 are positioned adjacent a palletized article, the proximal portion top edges 366 of the first side panels 360, the proximal portion top edges 376 of the inner support panels 380 and the proximal portion top edges 398 of the outer support panels 390 may abut the underside 106 of the shipping base 104, a.k.a. pallet or load platform.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A ramp comprising:
a bottom member made from a first bottom member blank, the bottom member comprising a rectangular base panel having a linear proximal edge, a linear distal edge and parallel opposing side edges, the bottom member further comprising an integrally formed proximal panel extending perpendicularly upward from the proximal edge and terminating at a proximal upper edge, the proximal panel defining four proximal slots extending downward from the proximal upper edge, the bottom member further comprising an integrally formed distal panel extending perpendicularly upward from the distal edge and terminating at a distal upper edge, the distal panel defining four linear distal slots extending downward from the distal upper edge; and
a top member made from a top member blank folded into a wedge shaped structure defining an interior space and comprising an elongated slanted top panel having opposing side edges, a distal edge and a proximal edge, a vertically oriented, substantially triangular, first side panel foldably attached to the top panel along each of the opposing side edges, each first side panel defining a first bottom edge and comprising a substantially rectangular rear portion having an top edge and extending rearward of the proximal edge, the top member further comprising a horizontally oriented rectangular bottom panel hingedly attached to each first side panel along the first bottom edge and extending to a second bottom edge parallel to the first bottom edge and a triangular inner support panel hingedly attached to each bottom panel along the second bottom edge, each inner support panel comprising a substantially rectangular second rear portion extending rearward of the rear edge and having a horizontal top edge, each inner support panel defining a slanted top edge parallel to and co-planar with the two side edges, wherein;
the inner support panels are located in the interior space;
the top member defines a transverse proximal slot configured to receive and engage the proximal panel of the bottom member and a transverse distal slot configured to receive the distal panel of the bottom member such that a portion of each of the two bottom panels of the top member located between the proximal slot and the distal slot abuts and rests on the base panel; and
the four proximal slots and the four distal slots receive and engage the side panels and the inner support panels of the top member.

2. The ramp of claim 1 wherein:
the top member is affixed to the bottom member such that each slanted top edge abuts the underside of the top panel to provide load bearing support.

3. The ramp of claim 2 wherein:
the proximal upper edge and the distal upper edge of the bottom member abut the underside of the top panel to provide load bearing support.

4. The ramp of claim 1 wherein:
the top edge of each rear portion and the top edge of each inner support panel are configured to abut the underside of a shipping base.

5. A ramp assembly for use in loading and offloading an article from a shipping base, the article having wheels, casters or other moving means, the ramp assembly comprising:
two ramps according to claim 1, each ramp disposed adjacent to the shipping base so that each rear portion is disposed under the shipping base.

6. The ramp assembly of claim 5 wherein:
the ramps are parallel to each other.

7. A ramp assembly comprising a single bottom member and first and second top members, wherein:
the bottom member is made from a second bottom member blank, the bottom member comprising a rectangular base panel having a proximal edge and a distal edge, an integrally formed proximal panel extending perpendicularly upward from the base panel along the proximal edge and terminating at a proximal upper edge, the proximal panel defining a first set of four proximal slots configured to receive a first top member and a second set of four proximal slots configured to receive a second top member, the bottom member further comprising an integrally formed distal panel extending perpendicularly upward from the base panel along the distal edge and terminating at a distal upper edge, the distal panel defining a first set of four distal slots configured to receive the first top member and a second set of four distal slots configured to receive the second top member;
each of the first and second top members is made from a top member blank folded into a wedge shaped structure defining an interior space and comprising an elongated slanted top panel having opposing side edges, a distal edge and a proximal edge, a vertically oriented, substantially triangular, first side panel foldably attached to the top panel along each of the opposing side edges, each first side panel defining a first bottom edge and comprising a substantially rectangular rear portion having an top edge and extending rearward of the proximal edge, the top member further comprising a horizontally oriented rectangular bottom panel hingedly attached to each first side panel along the first bottom edge and extending to a second bottom edge parallel to the first bottom edge and a triangular inner support panel hingedly attached to each bottom panel along the second bottom edge, each inner support panel comprising a substantially rectangular second rear portion extending rearward of the rear edge and having a horizontal top edge, each inner support panel defining a slanted top edge parallel to and co-planar with the two side edges, the inner support panels being located in the interior space; and wherein the proximal slots of each top member receive and engage the proximal panel of the bottom member and the distal slots of the top members receive and engage the distal panel of the bottom member to lock the top members onto the bottom member to form the ramp assembly.

8. The ramp assembly of claim 7 wherein:
each top member is affixed to the bottom member such that each slanted top edge abuts the underside of the top panel along the entire length of the slanted top edge to provide load bearing support.

9. The ramp assembly of claim 7 wherein:
the proximal upper edge and the distal upper edge of the bottom member abut the underside of the top panel of each top member to provide load bearing support.

10. The ramp assembly of claim 7 wherein:
the top edge of each rear portion and the top edge of each inner support panel are configured to abut the underside of a shipping base.

11. The ramp assembly of claim 10 wherein:
the top members are located in parallel relationship.

12. A one piece ramp comprising:
a bottom portion comprising a rectangular base panel having a proximal edge and a distal edge, an integrally formed vertical panel extending perpendicularly upward from the base panel along the proximal edge and terminating at a proximal upper edge, the vertical panel defining four proximal slots extending downward from the proximal upper edge; and
a top portion connected to the bottom member portion along the distal edge, the top portion forming a wedge shaped structure that defines an interior space, the top portion comprising an elongated slanted top panel having opposing side edges and a proximal edge, the top portion defining transverse slots, the top portion further comprising a side panel extending downward from each side edge and defining a first bottom edge, each side panel comprising a rear portion having a top edge and being partially separated from a main portion of the side panel by a proximal slot;
the top portion further comprising a proximal locking panel extending vertically downward from the rear edge and comprising four slots extending upward from a bottom edge and configured to receive and engage the side panels and the inner support panels;
the top portion further comprising a horizontally oriented bottom panel hingedly attached to each side panel along a first bottom edge and having a second bottom edge, the top portion further comprising a triangular inner support panel hingedly attached to each bottom panel along the second bottom edge, each inner support panel comprising a second rear portion extending rearward of the proximal edge and separated from a main part of the inner support panel by a slot, the inner support panels being located in the interior space; wherein
the slots are configured to receive and engage the side panels and the inner support panels.

13. The ramp of claim 12 wherein:
a portion of each of the two bottom panels abuts and rests on the base panel.

14. The ramp of claim 13 wherein:
the top edge of the vertical panel abuts an underside of the top panel.

15. The ramp of claim 14 wherein:
the slots receive and engage the side panels and the inner support panels.

16. The ramp of claim 15 wherein:
the slots are aligned with the slots in the side panels.

17. The ramp of claim 13 wherein:
the ramp is made from a single folded unitary blank.

18. A ramp comprising:
a bottom member comprising a rectangular base panel having a linear proximal edge and a linear distal edge, the bottom member further comprising an integrally formed proximal panel extending perpendicularly upward from the base panel along the proximal edge and terminating at a proximal upper edge, the proximal panel defining three or more proximal slots, the bottom member further comprising an integrally formed distal panel extending perpendicularly upward from the base panel along the distal edge and terminating at a distal upper edge, the distal panel defining three or more distal slots; and
a top member defining an interior space and comprising an elongated slanted top panel having opposing side edges, a distal edge and a proximal edge, a vertically oriented, substantially triangular side panel foldably attached to the top panel along each of the opposing side edges, each side panel defining a first bottom edge and comprising a substantially rectangular rear proximal portion having a top edge and extending rearward from the proximal edge, the top member further comprising a horizontally oriented bottom panel hingedly attached to each side panel along the first bottom edge and extending to a second bottom edge, a triangular inner support panel hingedly attached to the bottom panel along each second bottom edge and comprising a second rear portion extending rearward of the proximal edge and having a horizontal top edge, each inner support panel defining a slanted top edge parallel to and co-planar with the two side edges, the inner support panels located inside the interior space, and a triangular outer support panel hingedly attached to each inner support panel along a slanted top edge, each outer support panel comprising a substantially rectangular second rear portion extending rearward of the proximal edge of the top panel, the rectangular second rear portion having a horizontal top edge, each outer support panel defining a bottom edge that abuts a bottom panel, each outer support panel being in flat facing abutment with a corresponding inner support panel; wherein
the top member defines a transverse proximal slot configured to receive and engage the proximal panel and a transverse distal slot configured to receive the distal panel such that a portion of each of the two bottom panels located between the proximal slot and the distal slot abuts and rests on the base panel; and wherein
the three or more proximal slots and the three or more distal slots receive and engage the side panels, the inner support panels and the outer support panels.

19. The ramp of claim 18 wherein:
each slanted top edge abuts the underside of the top panel; and
the proximal upper edge and the distal upper edge of the bottom member abut the underside of the top panel to provide load bearing support.

20. The ramp of claim 19 wherein:
the bottom member is made from a bottom member blank and the top member is made from a separate top member blank.

* * * * *